United States Patent
Strannemar

(10) Patent No.: US 12,178,200 B2
(45) Date of Patent: Dec. 31, 2024

(54) FISHING VIBRATOR

(71) Applicant: Michael Strannemar, Key Largo, FL (US)

(72) Inventor: Michael Strannemar, Key Largo, FL (US)

(*) Notice: Subject to any disclaimer, the term of this patent is extended or adjusted under 35 U.S.C. 154(b) by 11 days.

(21) Appl. No.: 17/940,379

(22) Filed: Sep. 8, 2022

(65) Prior Publication Data
US 2023/0092402 A1 Mar. 23, 2023

Related U.S. Application Data

(60) Provisional application No. 63/247,139, filed on Sep. 22, 2021.

(51) Int. Cl.
*A01K 91/06* (2006.01)
*A01K 87/00* (2006.01)

(52) U.S. Cl.
CPC .......... *A01K 91/065* (2013.01); *A01K 87/008* (2022.02)

(58) Field of Classification Search
CPC ... A01K 91/065; A01K 87/008; A01K 87/007
USPC ...................... 43/19.2, 25; 601/46
See application file for complete search history.

(56) References Cited

U.S. PATENT DOCUMENTS

| | | | | | |
|---|---|---|---|---|---|
| 2,624,145 A | * | 1/1953 | Wehn | ............ | A01K 85/01 43/25 |
| 2,746,198 A | * | 5/1956 | Smith | ............ | A01K 91/065 43/19.2 |
| 2,783,576 A | * | 3/1957 | Filut | ............ | A01K 91/065 43/19.2 |
| 2,882,638 A | * | 4/1959 | Moore | ............ | A01K 91/065 43/26.1 |
| 2,908,103 A | * | 10/1959 | Mertz | ............ | A01K 91/065 43/25.2 |
| 3,789,534 A | * | 2/1974 | Yankaitis | ............ | A01K 91/065 43/19.2 |
| 3,835,570 A | * | 9/1974 | Philip | ............ | A01K 91/065 43/19.2 |
| 3,981,095 A | * | 9/1976 | Shepherd | ............ | A01K 91/065 43/19.2 |
| 4,020,582 A | * | 5/1977 | Thelen | ............ | A01K 91/065 43/19.2 |
| 4,084,342 A | * | 4/1978 | Philip | ............ | A01K 91/065 43/19.2 |
| 4,420,900 A | * | 12/1983 | Nestor | ............ | A01K 91/065 43/17 |

(Continued)

FOREIGN PATENT DOCUMENTS

| CN | 212937470 U | * | 4/2021 |
|---|---|---|---|
| FR | 2608371 A1 | * | 6/1988 |

(Continued)

*Primary Examiner* — Darren W Ark
(74) *Attorney, Agent, or Firm* — Ruben Alcoba, ESQ.

(57) ABSTRACT a fishing vibrator that is configured to be mounted on a fishing pole when fishing. The fishing vibrator comprises of a housing, a battery that is housed within the housing, a vibrating motor that is housed in the housing, the vibrating motor is operatively connected to the battery; an offset flywheel that is attached to the vibrating motor, a switch that is attached to the housing, a pair of u-shape pole rubber attachments that are used to attach the housing to the fishing pole, and a hook and loop system that is used to attach the housing to the fishing pole.

1 Claim, 3 Drawing Sheets

(56) References Cited

U.S. PATENT DOCUMENTS

| | | | | |
|---|---|---|---|---|
| 4,528,767 | A * | 7/1985 | Smith, Jr. | A01K 91/065 43/19.2 |
| 4,700,501 | A * | 10/1987 | Bryan | A01K 91/065 43/25 |
| 4,821,448 | A * | 4/1989 | Lindaberry | A01K 91/065 43/25 |
| 5,036,616 | A * | 8/1991 | Wilsey | A01K 91/065 43/26.1 |
| 5,179,797 | A * | 1/1993 | Edwards | A01K 97/125 43/25 |
| 5,535,538 | A * | 7/1996 | Heuke | A01K 91/065 43/26.1 |
| 5,962,817 | A * | 10/1999 | Rodriguez | G01G 19/60 177/171 |
| 6,658,783 | B1 * | 12/2003 | Yamanaka | A01K 97/00 43/25 |
| 6,779,291 | B2 * | 8/2004 | Arcand | A01K 85/01 43/4.5 |
| 6,785,998 | B2 * | 9/2004 | Seidler | A01K 91/065 43/19.2 |
| 6,836,995 | B1 * | 1/2005 | Zernov | A01K 91/065 43/26.1 |
| 6,920,714 | B1 * | 7/2005 | Modglin | A01K 91/065 43/19.2 |
| 7,093,387 | B1 * | 8/2006 | Spencer, Sr. | A01K 87/007 43/19.2 |
| 7,530,194 | B1 * | 5/2009 | Wrape | A01K 83/00 43/4.5 |
| 7,749,178 | B2 * | 7/2010 | Imboden | H02J 7/0042 601/72 |
| 8,176,673 | B2 * | 5/2012 | Bruell | A01K 91/065 43/25 |
| 8,628,466 | B2 * | 1/2014 | Orten | A61H 23/0263 600/38 |
| 10,231,900 | B2 * | 3/2019 | Murison | A61H 23/0254 |
| 10,772,312 | B1 * | 9/2020 | Norton | A01K 89/012 |
| 11,272,696 | B2 * | 3/2022 | Russell | A01K 85/01 |
| 2002/0095103 | A1 * | 7/2002 | Blue | A61H 23/0263 601/46 |
| 2004/0025402 | A1 * | 2/2004 | Seidler | A01K 91/065 43/19.2 |
| 2005/0193616 | A1 * | 9/2005 | Johnson | A01K 87/007 43/17 |
| 2008/0009775 | A1 * | 1/2008 | Murison | A61H 19/44 600/38 |
| 2008/0119767 | A1 * | 5/2008 | Berry | A61H 21/00 601/46 |
| 2008/0196292 | A1 * | 8/2008 | Bruell | A01K 91/065 43/19.2 |
| 2009/0318753 | A1 * | 12/2009 | Metri | G04G 15/00 600/38 |
| 2010/0275500 | A1 * | 11/2010 | Bruell | A01K 91/065 43/19.2 |
| 2011/0034837 | A1 * | 2/2011 | Lee | A61H 23/00 600/38 |
| 2011/0105837 | A1 * | 5/2011 | Lee | A61H 19/44 600/38 |
| 2011/0301514 | A1 * | 12/2011 | Reyes General | A61H 23/0218 601/46 |
| 2012/0102813 | A1 * | 5/2012 | Rosemann | A01K 97/01 43/26.1 |
| 2012/0317864 | A1 * | 12/2012 | Vanacore, Jr. | A01K 85/00 43/4.5 |
| 2013/0261385 | A1 * | 10/2013 | Zipper | A61H 23/0263 600/38 |
| 2016/0212982 | A1 * | 7/2016 | Clark | A01K 97/00 |
| 2020/0060250 | A1 * | 2/2020 | Russell | A01K 91/065 |
| 2020/0163321 | A1 * | 5/2020 | Nibecker | A01K 97/10 |

FOREIGN PATENT DOCUMENTS

| | | | | |
|---|---|---|---|---|
| GB | 2548586 A | * | 9/2017 | A01K 91/06 |
| KR | 20210001356 A | * | 1/2021 | |
| WO | WO-2016187007 A1 | * | 11/2016 | A01K 85/01 |

* cited by examiner

FISHING VIBRATOR

CROSS REFERENCE

This application claims priority to and the benefit under 35 U.S.C. section.119(e) of U.S. Provisional Patent Application No. 63/247,139, filed on Sep. 22, 2021, titled "VARIABLE VIBRATING FISHING SYSTEM," the entire disclosure of which is hereby incorporated herein by reference.

BACKGROUND

The present invention is directed to a fishing vibrator that is configured to be mounted on a fishing pole.

The fishing vibrator of the present invention is configured to make a fishing pole vibrate when it is turned on.

The fishing vibrator works by causing a fishing line that is attached to the fishing pole move in a wave manner when the line is in a body of water.

When the fishing line moves in a wave motion, any hook and/or lure that is attached to the fishing line will also move in a wave motion, the movement leads any fish that is in the vicinity of the lure to believe that there is creature attached to the hook and/or lure. The movement leads the fish to bite on the hook and thereby a fish is hooked using the present invention.

For the foregoing reasons, there is a need for a fishing vibrator that is configured to be mounted on a fishing pole that is used to attract and hook fish.

SUMMARY

The present invention is directed to a fishing vibrator that is configured to be mounted on a fishing pole when fishing.

The fishing vibrator comprises of a housing, a battery that is housed within the housing, a vibrating motor that is housed in the housing, the vibrating motor is operatively connected to the battery; an offset flywheel that is attached to the vibrating motor, a switch that is attached to the housing, a pair of u-shape pole rubber attachments that are used to attach the housing to the fishing pole, And, a hook and loop system that is used to attach the housing to the fishing pole.

An object of the present invention is to provide a fishing vibrator that attaches to a fishing pole, the fishing vibrator is used to attract fish when fishing.

Another object of the present invention is to provide a fishing vibrator that can be recharged.

Yet another object of the present invention is to prove a fishing vibrator that can be moved from one fishing rod to another.

DRAWINGS

These and other features, aspects, and advantages of the present invention will become better understood with regards to the following description, appended claims, and drawings where:

FIG. 1 is a side view of the present invention showing how it would be mounted on a fishing rod;

FIG. 2. is a side view of the present invention;

DESCRIPTION

Figure 1:
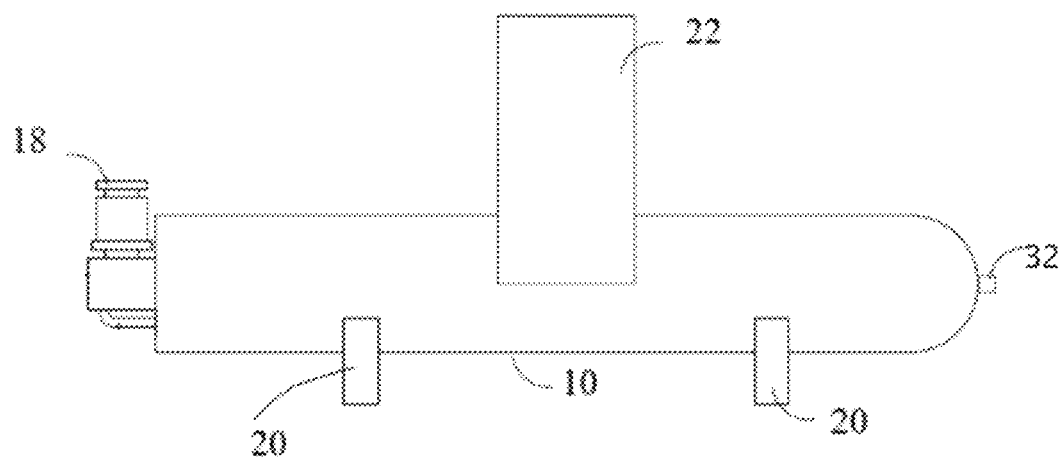
Figure 2:
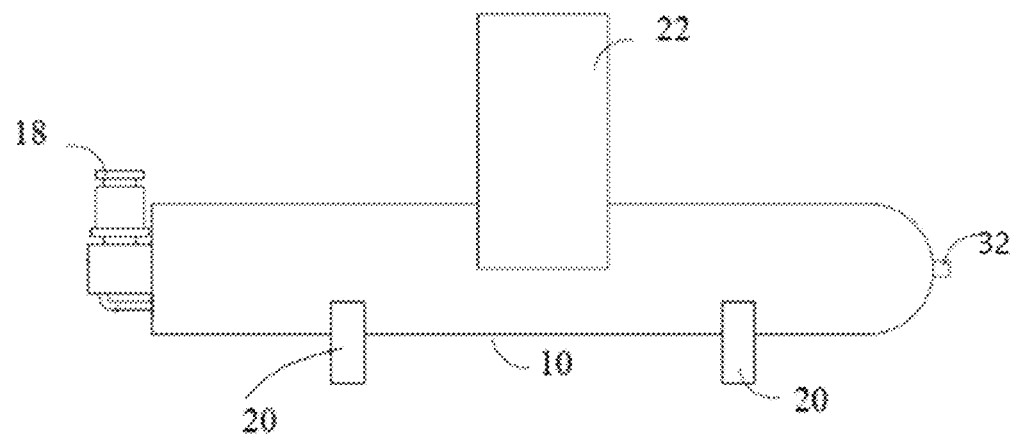
Figure 3:
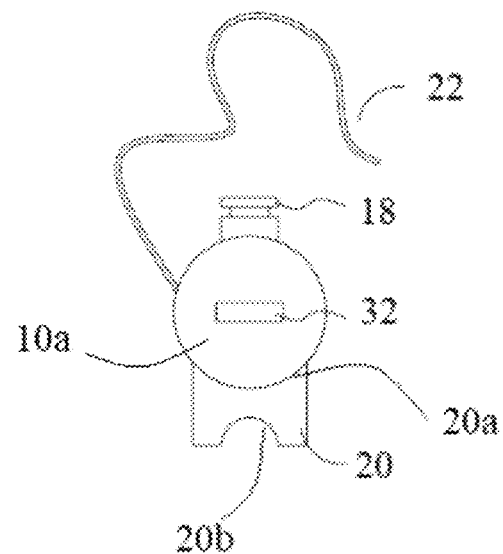
FIG. 3 is a front view of the present invention.
Figure 4:
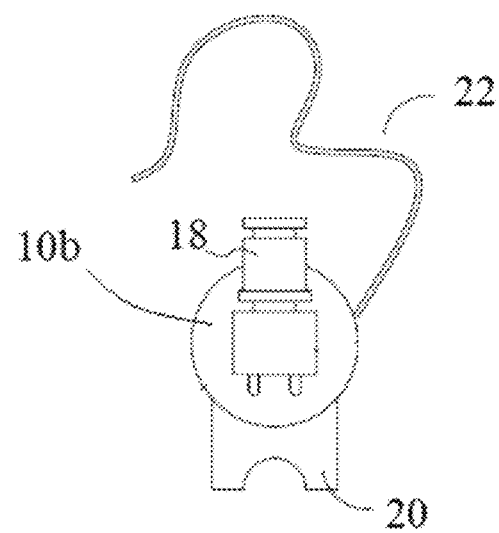
FIG. 4 is a rear view of the present invention.
Figure 5:
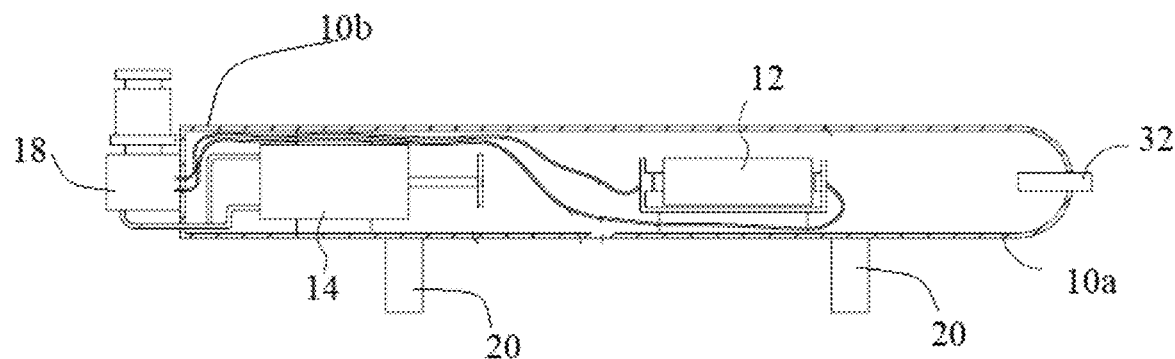
FIG. 5 is a sectional view of the present invention.
Figure 6:
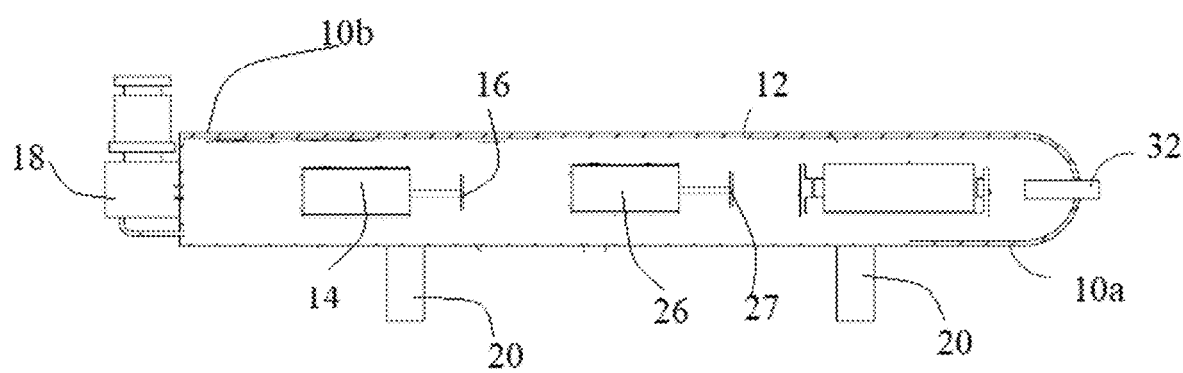
FIG. 6 is a sectional view of the of another embodiment of the present invention.

As seen in FIGS. 1-6, the present invention is a fishing vibrator 100 that is configured to be attached to a fishing pole 13 when fishing.

The fishing vibrator comprises of a housing 10 that has a first end 10a and a second end 10b. A battery 12 that is housed within the first end 10a of the housing 10, the housing 10 defines a port 32 configured to receive a charger 13, the port 32 is operatively connected to the battery 12.

A vibrating motor 14 that is housed within the second end of the housing 10b, the vibrating motor 14 is operatively connected to the battery 12. An offset flywheel 16 that is attached to the vibrating motor 14, the offset flywheel 16 is configured to spin when the fishing vibrator is turned on. A switch 18 that is attached to the second end 10b of the housing 10. A pair of u-shaped pole rubber attachments 20, a first section 20a of each u-shape pole attachment 20 is attached to the housing 10 and a u-section 20b of each pole attachment is configured to be mounted on a fishing pole 13. And, a hook and loop system 22 that is used to attach the housing 10 to the fishing pole.

The switch 18 of the present invention can be a push button switch or a variable resistor switch.

In preferred embodiments of the present invention, the battery 12 is a lithium battery.

The present invention can comprise of a pair of vibrating motors 14 that are aligned in series. In this configuration, a second vibrating motor 26 is housed within the housing 10 and is positioned between the vibrating motor 14 and the battery 12, the second vibrating motor 26 also having an offset flywheel 27. The switch 18, the vibrating motor 14, the second vibrating motor 16, and the battery 12 all being operatively connected.

An advantage of the present invention is that it provides a fishing vibrator that attaches to a fishing pole, the fishing vibrator is used to attract fish when fishing.

Another advantage of the present invention is that it provides a fishing vibrator that is rechargeable.

Yet another advantage of the present invention is that it provides a fishing vibrator that can be moved from one fishing rod to another.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the specification, the drawings, and the appended claims and their legal equivalents.

What is claimed is:

1. A fishing vibrator that is configured to be attached to a fishing pole when fishing, the fishing vibrator comprises:
    a housing having a first end and a second end;
    a battery that is housed within the first end of the housing, the housing defines a port that is configured to receive a charger, the port is operatively connected to the battery;
    a vibrating motor that is housed within the second end of the housing, the vibrating motor is operatively connected to the battery;
    an offset flywheel that is attached to the vibrating motor;
    a switch that is attached to the second end of the housing, the offset flywheel is configured to spin when the fishing vibrator is turned on with the switch;
    a pair of u-shaped pole rubber attachments, a first section of each u-shaped pole attachment is attached to the housing and a u-section of each pole attachment is configured to be mounted on the fishing pole; and a hook and loop system that is used to attach the housing to the fishing pole, wherein a second vibrating motor is housed within the housing and is positioned between the vibrating motor and the battery, the second vibrating motor also having an offset flywheel, the switch, the vibrating motor, the second vibrating motor and the battery all being operatively connected.

\* \* \* \* \*